3,090,701
METHOD OF PRECOATING AND COATING GLASS FIBERS AND ARTICLE PRODUCED THEREBY
William Shulver, Saylesville, R.I., and Gerald W. Guyer, Huntingdon, Pa., assignors to Owens-Corning Fiberglas Corporation, Toledo, Ohio, a corporation of Delaware
No Drawing. Filed Mar. 21, 1960, Ser. No. 16,138
6 Claims. (Cl. 117—76)

This invention concerns treating compositions or lubricants for glass surfaces and particularly a composition of this type for use in the treatment of glass fibers, strands, yarns or fabrics, prior to the application of a polytetrafluoroethylene coating.

Yarns and strands formed from glass fibers and provided with a coating of polytetrafluoroethylene have of late derived a popularity based upon the many unusual and desirable characteristics of such coating materials. However, the incompatibility of conventional size materials required for the proper processing and performance characteristics of the glass materials, with polytetrafluoroethylene has rendered necessary the removal of such sizes from the materials, prior to coating wtih the resin. Materials thus rendered devoid of the protective size material by means of heat cleaning or similar techniques, exhibit a high attrition rate, both in normal usage and when subjected to the abrasive and flexing conditions occasioned by the tension devices or other contact points entailed in the coating process. Such damage results both from the increased abrasion stemming from the removal of the size with its lubricating qualities and from the inherent weakening and reduced breaking strength caused by the heat treatment.

It is an object of the present invention to obviate the aforementioned disadvantages of existing techniques.

Another object is the provision of structures formed from glass fibers and provided with a coating which is compatible with polytetrafluoroethylene.

A further object is the provision of a method whereby articles formed from glass fibers may be provided with a coating which is compatible with polytetrafluoroethylene.

An additional object is the provision of polytetrafluoroethylene coated strands and yarns formed from glass fibers and provided with a size or lubricant which is compatible with the coating material.

Still another object is the provision of strands and yarns formed from glass fibers which possess enhanced breaking strengths.

Another object is the provision of methods and compositions for lubricating heat cleaned fiber glass strands and yarns prior to coating such structures with polytetrafluoroethylene.

A further object is to provide a method for coating strands or yarns formed from glass fibers with polytetrafluoroethylene.

An additional object is the provision of a lubricant for strands and yarns formed from glass fibers.

The aforegoing objects are achieved by the present invention through the application of novel treating compositions or lubricants. In practice, the compositions are applied to the glass surfaces, which may have been subjected to heat cleaning by conventional means. The structures thus treated exhibit enhanced breaking strengths and are compatible with polytetrafluoroethylene, rendering feasible the application of a coating of this material.

More specifically, in the exercise of the invention, heat cleaned glass fiber strands or yarns are provided with a coating of an ethylene oxide condensate or a polyethylene glycol fatty acid ester, prior to the application of the polytetrafluoroethylene.

The utilization of the compositions and methods of the present invention have resulted in the strengthening of glass fiber strands or yarns weakened by heat treatments, provided sized glass fiber yarns or strands which are compatible with polytetrafluoroethylene, eliminated or greatly reduced damage and attrition resulting from abrasive and abusive conditions attendant upon coating operations involving unsized glass materials, and provided strong polytetrafluoroethylene coated glass structures.

The lubricants or size compositions employed are preferably solutions of a condensate of ethylene oxide or fatty acid esters of polyethylene glycol. Excellent results have been achieved with the iso-octyl phenyl ether of polyethylene oxide prepared by condensing ethylene oxide with octyl phenol, and with polyethylene glycol monostearates of various molecular weights ranging between 800 and 5000. However, various equivalent materials are adaptable for use in the present invention. While aqueous solutions are preferred, solvents other than water may also be employed. Best results are achieved when the lubricant comprises 0.1–5.0% of the solution.

In addition, various additives such as coupling agents, film-forming materials, plasticizers and additional lubricants may also be included.

The treating compositions, size materials or lubricants are prepared by dissolving the ethylene oxide condensate or ethylene glycol fatty acid ester in water or other solvents.

The compositions may be applied by conventional application methods including contact apparatus in the form of roller, pad, or apron applicators, as well as by conventional spraying or immersion techniques. While highly satisfactory results have been achieved by soaking the yarn package for periods ranging between fifteen minutes and two hours, superior results are obtained by internal injection wherein the treating composition is introduced under pressure to the interior of a perforated spool or spindle upon which the yarn is wound.

The following table illustrates the increased breaking strengths achieved through the utilization of the methods and compositions of the present invention. The yarns employed were heat cleaned prior to application of the heating composition and comprised yarns of the type wherein 45,000 yards of the nominal basic strand, having an average diameter of .00023 inch are prepared from 1 pound of glass. These yarns were formed by plying two single strands:

| Yarn | Samples, Number | Average breaking Strength of Yarn (Pounds) |
|---|---|---|
| Untreated Yarn | 1 | 1.57 |
|  | 2 | 1.60 |
|  | 3 | 1.45 |
| Yarn Treated with an Aqueous Solution Containing 0.5% of the Condensate of Ethylene Oxide and Octyl Phenol | 1 | 2.03 |
|  | 2 | 2.003 |
|  | 3 | 2.01 |
| Yarn Treated with an Aqueous Solution Containing 0.25% of the Condensate of Ethylene Oxide and Octyl Phenol | 1 | 2.04 |
|  | 2 | 2.05 |
|  | 3 | 2.16 |
| Yarn Treated with an Aqueous Solution Containing 1% of the Condensate of Ethylene Oxide and Octyl Phenol | 1 | 2.47 |
|  | 2 | 2.41 |

Breaking strengths are set forth in pounds and were determined by means of a standard Scott tester. The average breaking strength was arrived at by taking the average of strength tests made on yarn samples taken from the interior, exterior and middle segment of each treated, wound package. The ethylene oxide composition employed in each case was the condensate of ethylene oxide and octyl phenol.

It can be noted that the materials treated with the methods and compositions of the present invention possess a breaking strength which is increased between 29 and 61%.

In addition, fuzz and breakout characteristics are reduced by 90%. Yarns, strands and fabrics treated with the compositions and methods of the invention have further proved compatible with polytetrafluoroethylene in the formation of coating or laminates with this polymer and highly desirable bonding between the fibers and resin, as well as satisfactory wet-cut were achieved.

As a coating material for the treated yarns, a polytetrafluoroethylene solution containing 60% polymer solids is suitable. The coating material may also contain wetting-out or dispersing agents.

While the methods and compositions of the present invention are particularly suitable for the treatment of glass surfaces and especially the surfaces of structures formed from glass fibers, they are also utilizable as size compositions for materials other than glass for which a polytetrafluoroethylene coating is desired.

It is evident from the aforegoing specification that a number of new and improved methods, compositions and treated products involving achievements of enhanced strength, laminate compatibility and processability are provided.

It is further understood that various changes, substitutions, additions and deletions may be made in the compositions, methods and products of the present invention without departing from the spirit of the invention, particularly as defined in the following claims.

We claim:
1. Coated strands comprising:
   (a) a plurality of continuous glass fibers in a substantially parallel relationship and a coating system upon the surfaces of said fibers and consisting essentially of:
      (1) a first coating adjacent to and in intimate engagement with said surfaces, and consisting essentially of the dried residue of a solution of a polyethylene derivative selected from the group consisting of ethylene glycol fatty acid esters and ethylene oxide condensates, and
      (2) superimposed upon said first coating, an exterior second coating consisting essentially of the dried residue of a liquid dispersion of polytetrafluoroethylene.
2. Coated strands as claimed in claim 1, in which said polyethylene derivative is the iso octyl phenyl ether of polyethylene oxide.
3. Coated strands as claimed in claim 1, in which said polyethylene derivative is polyethylene glycol monostearate.
4. A method for preparing coated strands comprising:
   (a) attenuating a plurality of continuous glass fibers from molten glass,
   (b) applying to the surfaces of said fibers, a solution of a polyethylene derivative selected from the group consisting of ethylene glycol fatty acid esters and ethylene oxide condensates, and
   (c) superimposing upon said polyethylene derivative a second coating consisting essentially of a liquid dispersion of polytetrafluoroethylene.
5. A method as claimed in claim 4 in which said polyethylene derivative is the iso octyl phenyl ether of polyethylene oxide.
6. A method as claimed in claim 4 in which said polyethylene derivative is polyethylene glycol monostearate.

References Cited in the file of this patent

UNITED STATES PATENTS

| | | |
|---|---|---|
| 2,569,575 | Philipps | Oct. 2, 1951 |
| 2,710,266 | Hochberg | June 7, 1955 |
| 2,780,909 | Biefeld et al. | Feb. 12, 1957 |
| 2,801,189 | Collier | July 30, 1957 |
| 2,920,981 | Whitehurst | Jan. 12, 1960 |
| 2,937,156 | Berry | May 17, 1960 |

OTHER REFERENCES

Synthetic Organic Chemicals, Carbide and Carbon Chemicals Co., thirteenth edition, received in Patent Office Jan. 29, 1953, pp. 50–53.